United States Patent [19]

Voss

[11] Patent Number: 4,634,016

[45] Date of Patent: Jan. 6, 1987

[54] FISH FORMULA CONTAINER ASSEMBLY

[75] Inventor: Martin L. Voss, Fort Lauderdale, Fla.

[73] Assignee: Voss Bros., Inc., Fort Lauderdale, Fla.

[21] Appl. No.: 775,237

[22] Filed: Sep. 12, 1985

[51] Int. Cl.$^4$ .................... F16M 13/00; A47D 15/00
[52] U.S. Cl. ..................... 220/69; 220/1 H; 248/103; 248/311.2; 248/313
[58] Field of Search ............... 220/69, 96, 1 H, 85 H; 224/42.45 R; 248/102, 103, 106, 276, 311.2, 313

[56] References Cited

U.S. PATENT DOCUMENTS

| | | | |
|---|---|---|---|
| 1,848,430 | 3/1932 | Morris | 248/313 X |
| 2,375,565 | 5/1945 | Liakopulos | 220/1 H |
| 2,557,430 | 6/1951 | Hensley et al. | 248/103 |
| 2,605,069 | 7/1952 | Gillaspy | 248/103 |
| 2,639,538 | 6/1953 | Gemmer | 43/55 |
| 3,138,994 | 6/1964 | Blunk | 224/42.45 R |
| 3,251,626 | 5/1966 | Martin | 248/103 X |
| 3,627,244 | 12/1971 | Nicholas | 248/103 |
| 3,668,739 | 6/1972 | Lewis | 17/53 |
| 3,844,519 | 10/1974 | Garrett | 248/311.2 X |
| 4,456,210 | 6/1984 | McBride | 248/205.5 |

*Primary Examiner*—Steven M. Pollard
*Attorney, Agent, or Firm*—Fleit, Jacobson, Cohn & Price

[57] ABSTRACT

The application of a fish formula (24) to a bait or lure by a fisherman, in a rapid, safe and expeditious manner, is facilitated by storing the formula in a container (22) of a container assembly (10) which is capable of being mounted on a rail (12) of a boat. The container assembly (10) is of a construction such that the container (22) can be moved into an inboard position when the boat is being moved to or away from a dock, or is underway over open water, and can be moved into an outboard position above the water for fishing. The container assembly (10) comprises a base or pedestal (16), a vertical support post (18) mounted on the base for movement about a vertical axis, and an arcuate cantilevered support arm (20) mounted on the vertical post for movement about a horizontal axis. The container (22) is supported on the arcuate support arm (20) by a mounting comprising a resilient bushing (68) and a screw-and-nut assembly (76, 78).

9 Claims, 4 Drawing Figures

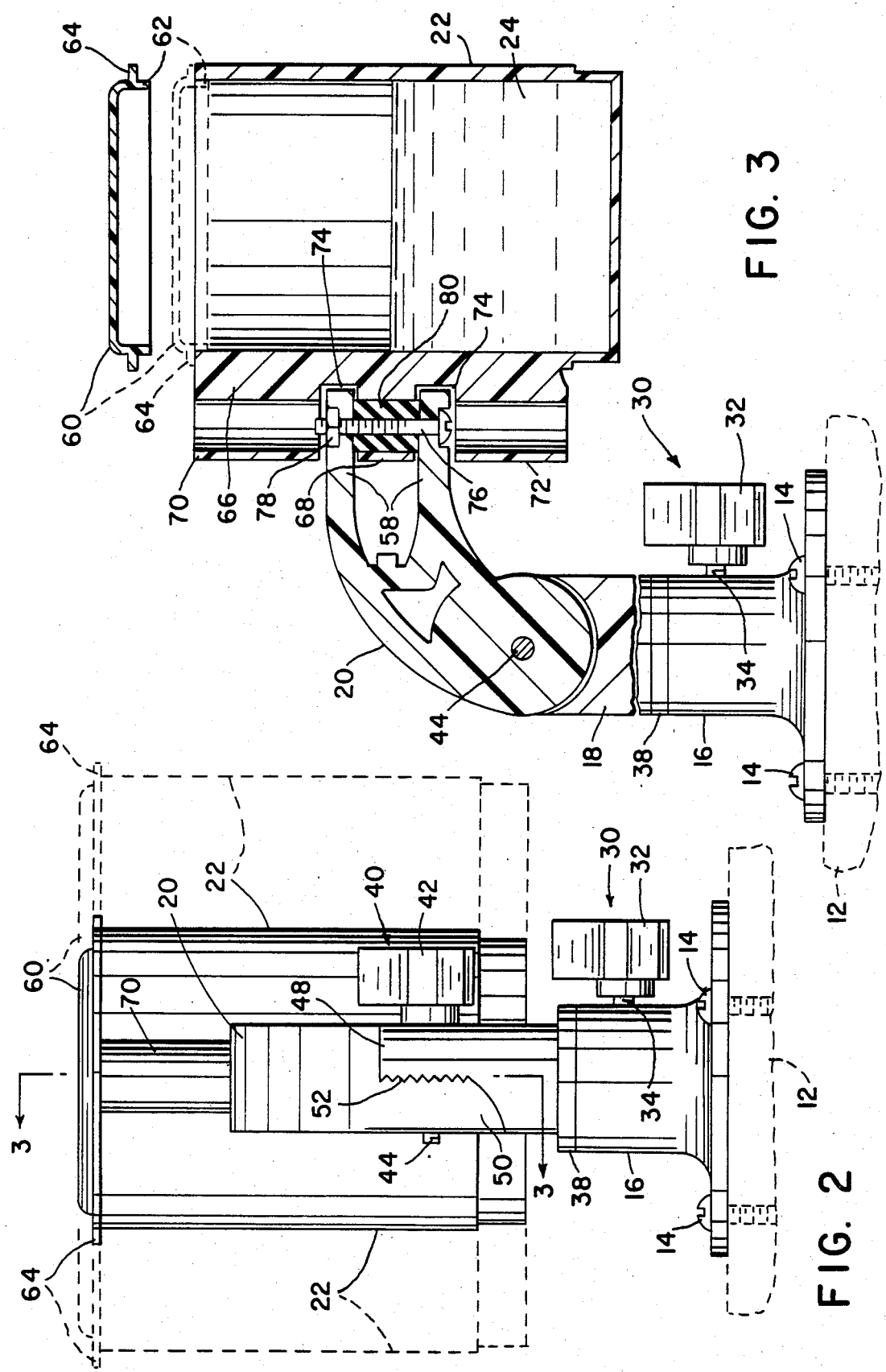

FISH FORMULA CONTAINER ASSEMBLY

BACKGROUND OF THE INVENTION

1. Field of the Invention

This invention relates to a fish formula container assembly, and more particularly to such a container assembly which can be mounted on a side of a boat for movement between inboard and outboard positions, and which facilitates the application of a fish formula to a bait or lure in a safe, rapid, and expeditious manner without spillage or waste of the fish formula.

2. Description of the Prior Art

It is general practice among more avid fishermen to increase their catch by applying a fish formula, which is attractive to fish, to a bait or lure prior to casting the bait or lure into the water. The fish formula, which is available commercially, usually comes in liquid form in a bottle, spray can or other type container.

Heretofore, the fish formula has been applied to the bait or lure by pouring, spraying or dipping. In either instance, it is necessary for the fisherman to put down his fishing pole or casting rod, grasp the bait or lure end of the fishing line in one hand, and hold the fish formula container in the other hand. The fish formula than may be poured or sprayed onto the bait or lure, which is extremely wasteful of the formula, and if done inside the boat, frequently results in drops or spills of the formula onto the user's hands, clothing, fishing gear, the boat, or the boat accessories. This procedure is further undesirable because the fish formula normally is of a greasy consistency, which is hard to clean. Dipping the bait or lure into the fish formula is subject to the same disadvantages, although to a lesser degree. Further, if the fisherman leans over the side of the boat to apply the fish formula to the bait or lure, so as to avoid dripping or spillage of the formula inside the boat, since the fisherman has both hands occupied for the application procedure, there is a danger that the fisherman may lose his balance and fall overboard into the water.

Accordingly, a need exists for a device by which the fish formula can be applied to the bait or lure in a rapid, safe and expeditious manner, without spillage or waste, and a primary purpose of this invention is to provide such a device. More specifically, the purpose of this invention is to provide a fish formula container assembly which is capable of being mounted on a boat rail for movement into an inboard position, when the boat is being maneuvered to or away from a dock, or when the boat is underway, and into a preselected outboard position over the water when the boat is being utilized for fishing. The nature of the container assembly in accordance with the invention is such that the application of the fish formula to the bait or lure can be accomplished without the fisherman having to lay down his fishing pole or casting rod, without any significant spillage or waste of the fish formula, and the subsequent cleanup required as a result thereof, and without the fisherman having to lean over the side of the boat, with the danger of falling overboard into the water.

SUMMARY OF THE INVENTION

In general the subject invention relates to a container assembly which is suitable for mounting on a side of a boat, and which comprises a container capable of holding a fish formula, a base member capable of being mounted on the side of the boat, and support means for mounting the container on the base member for rotation about a vertical axis between inboard and outboard positions. A clamping means is provided for clamping the support means in preselected positions about the vertical axis, and a means is provided for mounting the container on the support means.

More specifically, the container assembly comprises a first support means for mounting the container for movement about a vertical axis, and a second support means for mounting the container for movement about a horizontal axis. At least the base member or the first support means includes a projecting hub portion having a cylindrical recess, and the other of the base member or the first support means includes a projecting cylindrical stub shaft rotatably received in the recess, with a first clamping means including a screw threaded clamping member mounted in the hub portion. Further, an upper end of the first support means and a lower end of the second support means have opposed mating portions formed with annular rows of intermeshed retaining teeth, and a second clamping means comprises another screw member extending axially through the opposed mating portions. A resilient member is mounted in opposed internal recesses of the opposed mating portions adjacent the latter screw member, and an upper end of the second support means is defined by a pair of spaced apertured projecting mounting lugs.

In addition, the container contains an apertured mounting portion positioned between the spaced projecting mounting lugs of the second support means, and a screw member of a screw-threaded locking device extends through the apertured lugs and mounting portion. A resilient material is disposed within the apertured mounting portion on the container around the screw member extending therethrough, and is releasably compressed between the mounting lugs by the screw-threaded locking device. The container further includes tubular projecting portions located above and below respective ones of the mounting lugs and having apertures extending therethrough in alignment with the screw-threaded locking device, with the tubular projecting portions being located closely adjacent their respective lugs so as to stabilize the mounting of the container thereon. In addition, the container has an open top and includes a cover member having an annular sealing portion receivable in the open top with a resilient press fit, and having at least one lifting tab projecting therefrom.

BRIEF DESCRIPTION OF THE DRAWINGS

FIG. 2 is a rear elevational view of the container assembly in accordance with the invention, as viewed in the direction of the arrows 2—2 in FIG. 1;

FIG. 3 is a rear elevational view, partially in cross section, as viewed along the line 3—3 in FIG. 2, and with the upper portion of the container assembly rotated 90°.

DETAILED DESCRIPTION

Figures 1, 4:
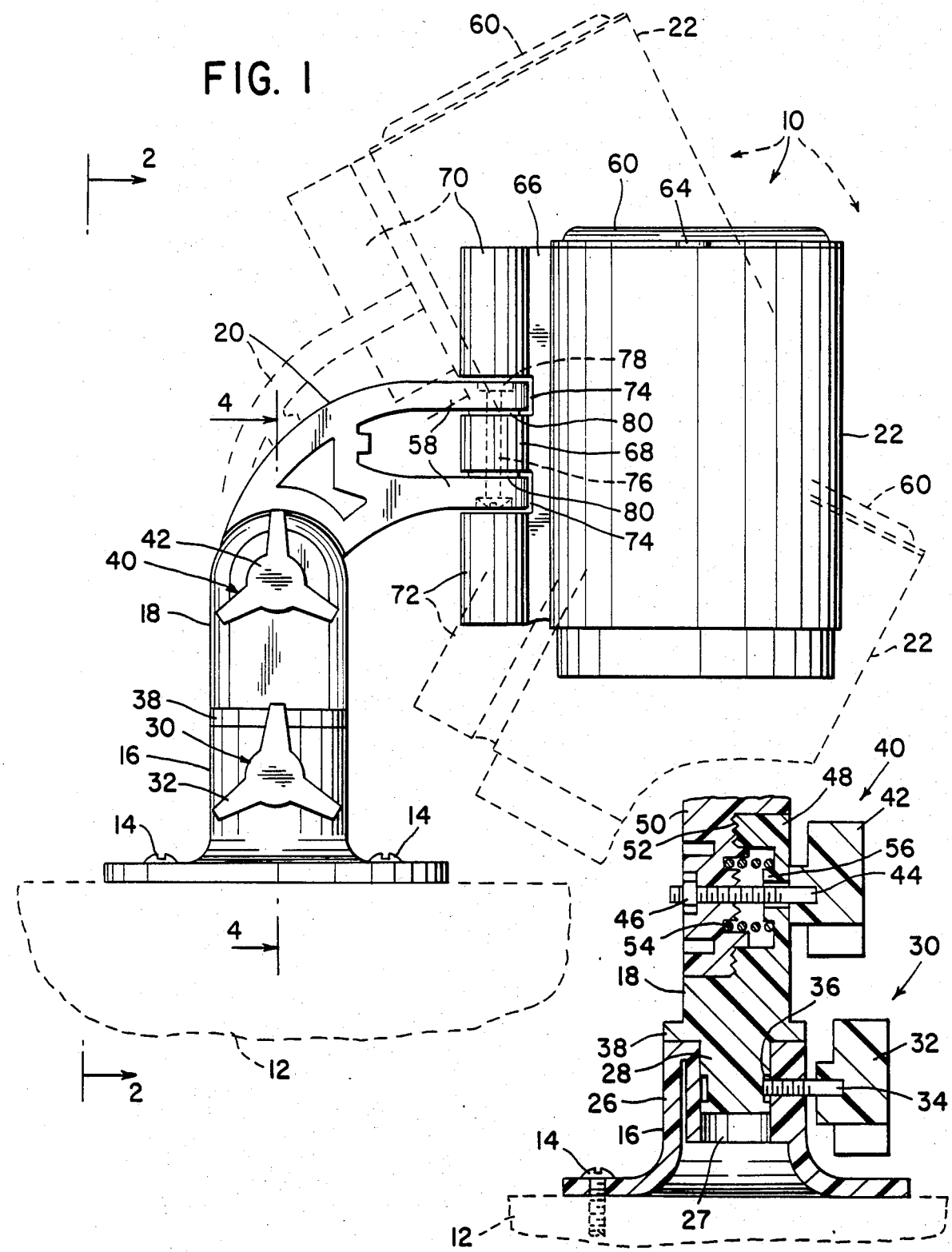
FIG. 1 is a side elevational view of a fish formula container assembly in accordance with the invention, mounted on a rail of a boat.
FIG. 4 is a cross sectional view of a portion of the container assembly, taken along the line 4—4 in FIG. 1.

Referring to FIG. 1, a fish formula container assembly 10 in accordance with the invention is shown mounted on a top horizontal surface of a boat rail 12 by screws 14. The container assembly 10 comprises a base or pedestal 16 and a vertical support post 18 mounted on the base for movement about a vertical axis into preselected positions, as illustrated by dashed lines in FIG. 2. The container assembly 10 further includes an arcuate cantilevered support arm 20, which is mounted on an upper end of the vertical support post 18 for movement about a horizontal axis into preselected positions, as illustrated by dashed lines in FIG. 1. A container 22, for holding a supply of liquid fish formula 24, is mounted on an outer upper end of the support arm 20.

Referring to FIG. 4, the base 16 includes an upstanding hub portion 26 having an internal cylindrical socket or recess 27, which receives a depending stub shaft 28 on the vertical support post 18. The vertical support post 18 is retained on the hub portion 26 and can be releasably locked in a preselected angular position thereon, by a screw threaded clamp 30 which includes a handle 32 and a screw-threaded locking member 34 having an inner end seated in an annular groove 36 in the stub shaft 28. The vertical support post 18 further includes an annclar horizontal collar 38 which seats upon the top of the base 16.

With further reference to FIG. 4, the arcuate support arm 20 is secured to the upper end of the vertical post 18 by a second clamp assembly 40 which includes a handle 42, a screw 44 and a screw-threaded retaining nut 46 receivable in a recess in one side of the support arm. One side of the vertical support post 18 includes an upwardly extending portion 48 of approximately one half the width of the lower portion of the post, and an opposite side of the arcuate support arm 20 has a depending portion 50 of approximately one-half the width of the upper portion of the arm. The post upper portion 48 and the arm depending portion 50 are held secured together in opposed mating relationship as shown in FIG. 4, by the clamp assembly 40, such that the post 48 and the arm 20 essentially form one continuous member, as is best shown in FIGS. 2 and 4.

Mating portions of the vertical support post 18 and the arcuate support arm 20 are provided with respective annular rows of intermeshing teeth 52, as shown in FIG. 4, to facilitate the retaining of the arm in a desired relative position to the post about a horizontal axis defined by the screw 44. A coil biasing spring 54 is disposed in a cavity formed by opposed recesses in the mating post and arm portions 48 and 50, respectively, to facilitate disengagement of the teeth 52 and pivoting of the arm 20 into a desired position relative to the post 18. Preferably, the coil spring 54 is force-fitted over an internal annular collar 56 of the upwardly extending post portion 48, to facilitate assembly of the arm 20 to the post 18 and to prevent loss of the spring when the arm 20 is removed from the post. As is best shown in FIGS. 1 and 3, an upper outer end of the arm 20 is bifurcated to define a pair of vertically spaced, horizontally projecting lug portions 58.

The container 22 for the fish formula 24 is in the form of a cylindrical cup member having a removable cover 60. The bottom of the cover 60 is in the form of a resilient annular ring 62 which is received in the top of the container with a slight force fit, to retain the cover on the container, and still permit removal of the cover therefrom. For removal purposes, the cover 60 may include a pair of lift tabs 64 at opposite sides thereof.

Along the left hand side of the container 22, as viewed in FIGS. 1 and 3, the container includes an integral essentially vertical reinforcing and mounting rib 66. The rib 66 is integrally formed with a central tubular mounting section 68 and upper and lower tubular reinforcing sections 70 and 72, respectively. The central tubular mounting section 68 is spaced from the upper and lower tubular sections 70 and 72 by slots 74, which receive respective ones of the spaced mounting lugs 58 on the upper outer end of the arcuate support arm 20.

The container 22 is resiliently mounted on the lugs 58 of the arcuate support arm 20 by a screw-and-nut assembly which includes a screw 76 and a nut 78, and by a resilient cylindrical bushing or packing member 80 of a resilient material such as rubber, disposed in the central tubular mounting section 68 around the screw 76. Upper and lower portions of the bushing 80 extend beyond the central tubular mounting section 68, as shown in FIGS. 1 and 3, such that when the screw and nut assembly 76, 78 is tightened, causing a slight flexing of the lugs 58 toward one another, the resilient bushing is compressed by the lugs to resiliently secure the container against movement relative to the arm 20.

The upper and lower tubular reinforcing sections 70 and 72 of the container 22 preferably have inner portions located closely adjacent opposed surfaces of the mounting lugs 58 of the support arm 20, to limit relative movement between the container and the arm and thus provide stability to the mounting of the container on the arm as a result of the inner ends of the tubular sections engaging the top surface of the upper lug and the bottom surface of the lower lug, respectively, in the event the container should inadvertently be struck by the user or by an extraneous object during use. At the same time, since the reinforcing sections 70 and 72 are of tubular construction, they permit access to the head of the screw 76 and the retaining nut 78 for assembly, tightening and releasing thereof. Thus, the resilient bushing 80 and the tubular reinforcing sections 70 and 72 cooperate to provide a resilient mounting for the container 22, with a limited degree of movement, so as to reduce the possibility of breakage of the mounting during use.

The container assembly 10 in accordance with the invention, with the exception of the screws 14, 34, 44 and 76, preferably is entirely of molded construction. For example, the base 16, vertical support post 18, arcuate support arm 20, the container 22, including the integral reinforcing rib 66 and the integral tubular sections 68, 70 and 72, and the container cover 60, all may be formed by molding utilizing a suitable nylon-filled plastic. Similarly, the handles 32 and 42 of the clamp assemblies 30 and 40, respectively, also may be formed about ends of the screws 34 and 44, respectively, by molding, utilizing a suitable nylon-filled plastic.

In use of the fish formula container assembly 10 in accordance with the invention, when the boat upon which the container assembly is being utilized is being moved to or away from a docking position, or is underway over open water, the container 22 is retained in an inboard position above the inside of the boat, or in a position above the top rail 12 of the boat, as illustrated in FIG. 2. When the boat reaches a fishing site and it is desired to utilize the container assembly 10 for fishing, the cover 60 is removed from the container 22, the clamp 30 is loosened, and the upper portion of the assembly is pivoted about its vertical axis, to position the container outboard of the boat in a position above the water, as illustrated in FIG. 3, whereupon the clamp is retightened. If desired, the clamp 40 also may be loosened to adjust the container 22 about the horizontal axis defined by the screw 44, to position the container 22 in a selected vertical orientation, as illustrated by dashed lines in FIG. 1. The container 22 also may be adjusted about the vertical axis defined by the screw 76, if so desired. The fish formula 24 may be poured into the container 22 either prior to, or after reaching the fishing site, as desired.

During fishing, to apply the fish formula 24 to his bait or lure, it is only necessary for the fisherman to dip the bait or lure into the formula in the container 22, remove the bait or lure from the formula and cast his fishing line into the water. When the fisherman wishes to reapply the fish bait or lure formula 24 to his bait or lure, it is only necessary to remove the line from the water, redip the bait or lure into the formula, and then recast the line into the water, this procedure being repeated as often as desired.

In summary, applicant has provided a fish formula container assembly, such as the container assembly 10, which can be readily mounted upon a boat rail for movement between an inboard position when the boat is moving toward or away from a dock, or is underway on open water, and into an outboard position over the water for use during fishing. The container assembly 10 is of strong, durable construction and enables a fisherman to apply the fish formula 24 to a bait or lure in a rapid, safe and expeditious manner. In this regard, the fish formula 24 readily can be applied to the bait or lure merely by dipping the bait or lure into the formula in the container 22, without the fisherman having to set down his fishing pole or casting rod, or handle the formula. As a result, excessive waste or spillage of the fish formula 24, and the attendant cleanup thereof, and the danger of the fisherman falling overboard while leaning over the water in an attempt to apply the formula to his bait or lure by hand, all have been eliminated.

What is claimed is:

1. A fish formula container assembly capable of being mounted on a side of a boat, which comprises:
   a container capable of holding a fish formula and of being movable above the side of the boat between inboard and outboard positions;
   a base member capable of being rigidly mounted on the side of the boat;
   a vertical support post extending above the base member and having upper and lower ends, the post being mounted at its lower end on the base member for rotation about a vertical axis, with the base member or the post including a projecting hub portion having a cylindrical recess and the other of the base member or the post having a stub shaft rotatably received in the recess;
   first clamping means mounted on the hub portion for clamping the vertical support post in preselected positions about the vertical axis;
   a cantilevered container support arm having opposite inner and outer ends, the inner end of the arm and the upper end of the vertical support post having opposed mating portions;
   pivot means extending through the opposed mating portions of the upper end of the vertical support post and the inner end of the cantilevered support arm for mounting the arm on the post for pivotable movement about a horizontal axis;
   second clamping means for clamping the cantilevered support arm in preselected positions about the horizontal axis;
   a pair of vertically spaced apertured mounting lugs projecting horizontally from the outer end of the cantilevered support arm or the container;
   an apertured mounting portion on the other of the cantilevered support arm or the container and disposed between the apertured mounting lugs; and
   a locking device having an elongated clamping member extending through aligned apertures in the projecting mounting lugs and the mounting portion.

2. The container assembly as recited in claim 1, wherein:
   the locking device is screw-threaded and includes a screw-threaded clamping member extending through the aligned apertures in the projecting mounting lugs and the mounting portion; and
   a resilient means is disposed in the aperture in the mounting portion around the clamping member extending therethrough, the resilient means extending above and below the mounting portion and being releaseably compressed between the mounting lugs by the screw-threaded locking device.

3. The container assembly as recited in claim 2, wherein:
   the cantilevered support arm or the container further includes spaced tubular projecting portions located above and below respective ones of the spaced apertured mounting lugs and having apertures extending therethrough in alignment with the screw-threaded locking device; and
   the tubular projecting portions are located closely adjacent their respective mounting lugs so as to stabilize the mounting of the container on the lugs.

4. The container assembly as recited in claim 2, wherein:
   the resilient means disposed in the aperture in the mounting portions around the clamping member extending therethrough is a cylindrical resilient bushing of rubber-like material.

5. The container assembly as recited in claim 1, wherein:
   the base member is capable of being mounted on a horizontal top surface of a boat rail on the side of the boat.

6. A fish formula container assembly capable of being mounted on a top horizontal surface of a boat rail, which comprises:
   a container capable of holding a fish formula and of being movable above the boat rail between inboard and outboard positions;
   a base member capable of being rigidly mounted on the top horizontal surface of the boat rail;
   a vertical support post extending above the base member and having upper and lower ends, the post being mounted at the lower end thereof on the base member for rotation about a vertical axis, with the base member or the lower end of the post including a projecting hub portion having a cylindrical recess and the other of the base member or the lower end of the post having a stub shaft rotatably received in the recess;
   screw-threaded clamping means mounted on the hub portion for clamping the vertical support post in preselected positions about the vertical axis;
   an arcuate cantilevered container support arm having opposite inner lower and outer upper ends, the inner lower end of the arcuate support arm and the outer upper end of the vertical support post having opposed mating portions;

a first clamping member having a screw-threaded portion extending through the opposed mating portions of the upper end of the vertical support post and the inner lower end of the arcuate support arm for mounting the arm on the post for pivotable movement about a horizontal axis;

a second clamping member screw-threadably mounted on the screw-threaded portion of the first clamping member for clamping the arcuate support arm in preselected positions about the horizontal axis;

a pair of vertically spaced apertured mounting lugs projecting horizontally from the outer end of the arcuate support arm;

an apertured mounting portion on the container disposed between the spaced apertured lugs on the arcuate support arm;

a screw-threaded locking-device having a screw-threaded clamping member extending through aligned apertures in the projecting mounting lugs on the arcuate support arm and the mounting portion on the container;

a resilient cylindrical bushing of rubber-like material disposed in the aperture in the mounting portion on the container around the clamping member extending therethrough, the resilient cylindrical bushing extending above and below the mounting portion and being releasably compressed between the mounting lugs on the arcuate support arm by the screw-threaded locking device; and spaced tubular projections on the container located above and below respective ones of the spaced apertured mounting lugs on the arcuate support arm and having apertures extending therethrough in alignment with screw-threaded locking device, the tubular projecting portions being located closely adjacent their respective mounting lugs so as to stabilize the mounting of the container on the lugs.

7. The container assembly as recited in claim 6, wherein;

the opposed mating portions of the vertical support post and the cantilevered support arm are formed with annular rows of intermeshed retaining teeth;

the pivot means comprises a screw-threaded clamping member extending axially through the opposed mating portions;

the opposed mating portions of the vertical support post and the cantilevered support arm include opposed internal recesses through which the clamping member extends; and a resilient member is mounted in the opposed internal recesses of the opposed mating portions adjacent the clamping member.

8. The container assembly as recited in claim 6, the container has an open top and includes a cover member for the open top.

9. The container assembly as recited in claim 8, wherein:

the cover member has an annular sealing portion receivable in the open top of the container with a resilient press fit, and has at least one lifting tab projecting from the cover member.

* * * * *